July 1, 1958 W. L. PRINGLE 2,841,413
SPRING SEAT AND TRUNNION BEARING FOR VEHICLE SUSPENSION
Filed June 11, 1953 3 Sheets-Sheet 1
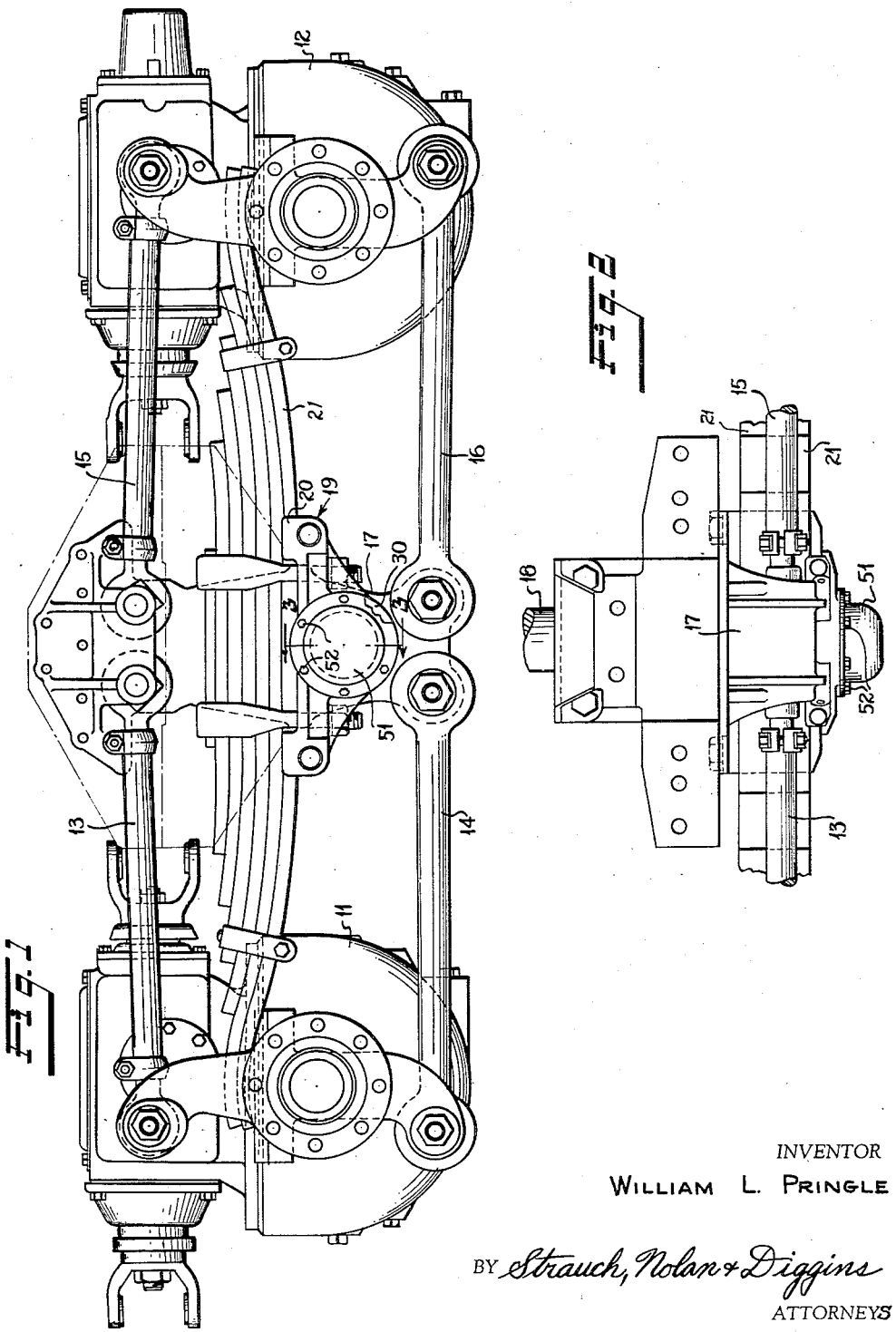
INVENTOR
WILLIAM L. PRINGLE
BY *Strauch, Nolan & Diggins*
ATTORNEYS July 1, 1958 W. L. PRINGLE 2,841,413
SPRING SEAT AND TRUNNION BEARING FOR VEHICLE SUSPENSION
Filed June 11, 1953 3 Sheets-Sheet 2

INVENTOR
WILLIAM L. PRINGLE
BY Strauch, Nolan & Diggins
ATTORNEYS

July 1, 1958  W. L. PRINGLE  2,841,413
SPRING SEAT AND TRUNNION BEARING FOR VEHICLE SUSPENSION
Filed June 11, 1953  3 Sheets-Sheet 3

INVENTOR
WILLIAM L. PRINGLE
BY Strauch, Nolan + Diggins
ATTORNEYS

United States Patent Office 2,841,413
Patented July 1, 1958

2,841,413

SPRING SEAT AND TRUNNION BEARING FOR VEHICLE SUSPENSION

William L. Pringle, Dearborn, Mich., assignor, by mesne assignments, to Rockwell Spring and Axle Company, Coraopolis, Pa., a corporation of Pennsylvania Application June 11, 1953, Serial No. 361,009

6 Claims. (Cl. 280—104.5)

This invention relates to tandem axle vehicle suspensions and is particularly directed to threaded trunnion spring seat mountings.

In the conventional tandem axle assembly, the spring seat at each side of the vehicle frame is journalled upon a trunnion which is rigid with the frame. During road operation of the vehicle, the spring and spring seat undergo rocking movement about the trunnion, usually through only small angles, the entire spring assembly oscillating like a walking beam pivoted on the trunnion and connected at opposite ends to the respective axles. Substantially the entire load of the chassis is carried by the trunnions, and the problem of wear between the spring seats and trunnions is serious. Many attempts to solve the problem have been proposed without really adequate solution.

Up until the present time, the most satisfactory method of mounting the spring seat for oscillation on the trunnion has been to provide a pair of spaced tapered roller bearings on each trunnion with their inner races fixed to the trunnion and their outer races fixed to the spring seat, with provision for lubricating them and for preventing dirt and the like from entering them. However such bearings are designed for use between two relatively rotating members and their use for the support of a beam rocking back and forth over relatively small angles introduces problems not contemplated in their design and these tapered roller bearings often break down in service. Theoretically, considering the rollers themselves and the inner race or cone and outer race or cup as all non-elastic, there is only line contact and extremely high unit area pressure between each roller and the cone and cup in such a tapered roller thrust bearing. In actual practice, however, the rollers and both the cone and the cup resiliently deform and the load is distributed over somewhat more than theoretical line contacts, and this results in unit pressures which are reasonably distributed for an assembly subject mainly to pure rotation. However, when such bearings are subject to small angle oscillation under the high pressures encountered in tandem axle vehicle operation the resultant relatively high unit area pressures between the rollers and the cone and cup result in galling and brinelling of the cone and cup surfaces by the rollers. This eventually forms indentations in the roller bearing cones and cups.

Bearing cones are usually creep fits on the trunnions and the cups are usually press fitted within bores in the spring seats. Resistance to relative motion between the cone and cup of these roller thrust bearings due to brinelling of the cones and cups soon results in relative motion between the cone and the trunnion, and since the cone is very hard this eventually results in wear damage to the trunnion and failure of the suspension. Sleeve bushings of ordinary bearing metal such as bronze have been tried between the spring seat and trunnion to obtain lower unit area pressures but these bushings have not proved adequate because of the very high total pressures involved.

According to the present invention, I provide threaded hardened bearing sleeves between the spring seat and the trunnion whereby the unit area pressures are distributed more widely than the prior roller bearing constructions, and the structure is mechanically more simple and the cost of the parts and assembly operations are reduced. The invention produces a shock resistant assembly which has a long life with increased safety and operating features.

It is the major object of my invention to provide a novel spring seat mount on a trunnion in a tandem axle vehicle wherein the load is carried by threaded bushings.

A further object of my invention is to provide a novel threaded bushing spring seat mount and parts thereof which can be adapted for use with spring seats that are in use already in the field so that my threaded bushings may be directly substituted in the field or in service for hitherto supplied roller thrust bearings which have become defective.

It is a further object of my invention to provide a threaded bushing trunnion construction for a tandem axle vehicle and the like wherein the inner bushing is held against rotation with respect to the trunnion in a novel manner.

Further objects of the invention will presently appear as the description proceeds in connection with the appended claims and the annexed drawings in which:

Figure 1 is a fragmentary side elevation of a conventional type of multi-wheeler tandem axle assembly embodying a preferred form of my invention;

Figure 2 is a fragmentary top plan view of the bracket and trunnion support at one side of the vehicle;

Figure 6 is an enlarged section similar to Figure 3 but disclosing a different type of threaded sleeve bushing arrangement.

Figure 3:
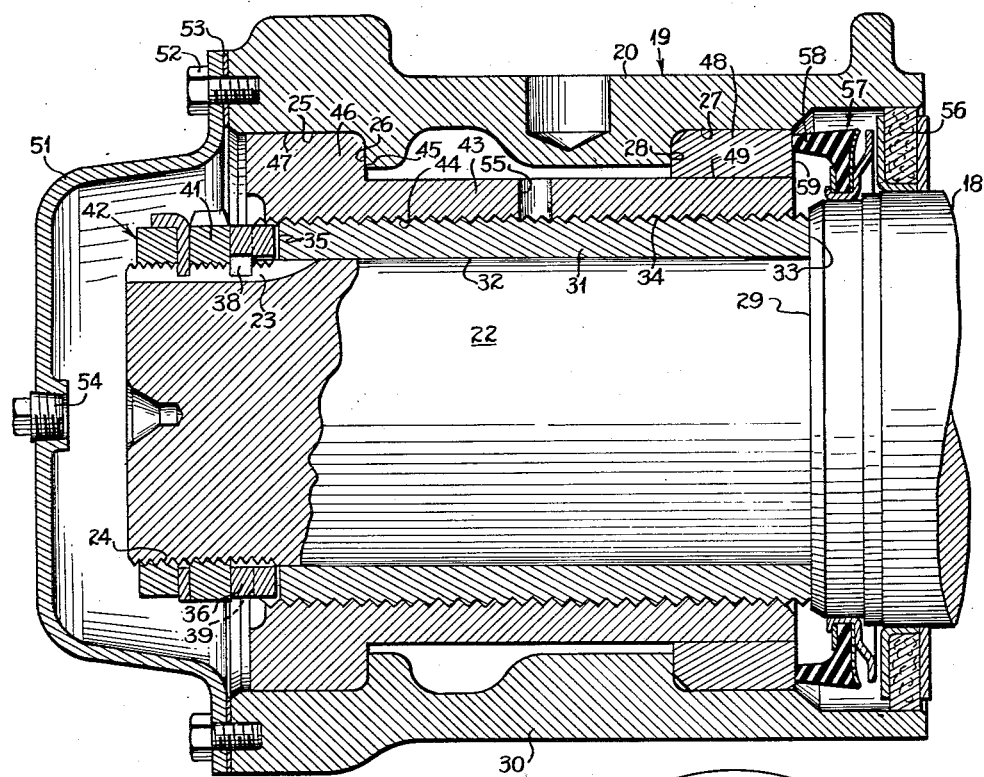
Figure 3 is an enlarged section through a trunnion end at one side of the vehicle substantially on line 3—3 of Figure 1 illustrating a preferred embodiment of my threaded bushings for supporting the spring seat on the trunnion, the radial key on the locking ring and the coacting keyway on the trunnion both being shown 90° out of position for purposes of illustration.
Figure 4:
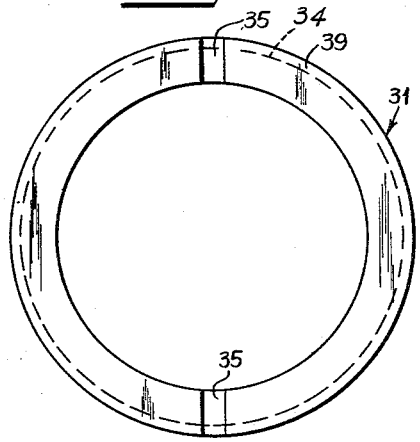
Figure 4 is an end view of the inner threaded sleeve bushing which is mounted on the trunnion end.
Figure 5:
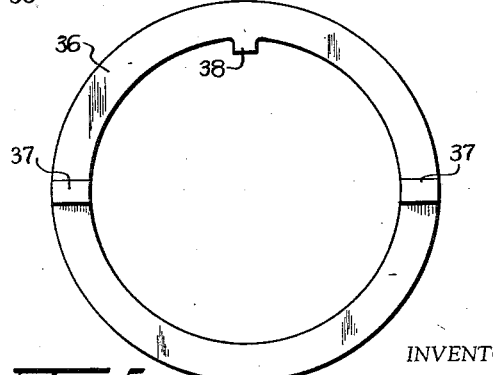
Figure 5 is an end view of the special locking ring for non-rotatably connecting the inner sleeve bushing to the trunnion.
Figure 8:
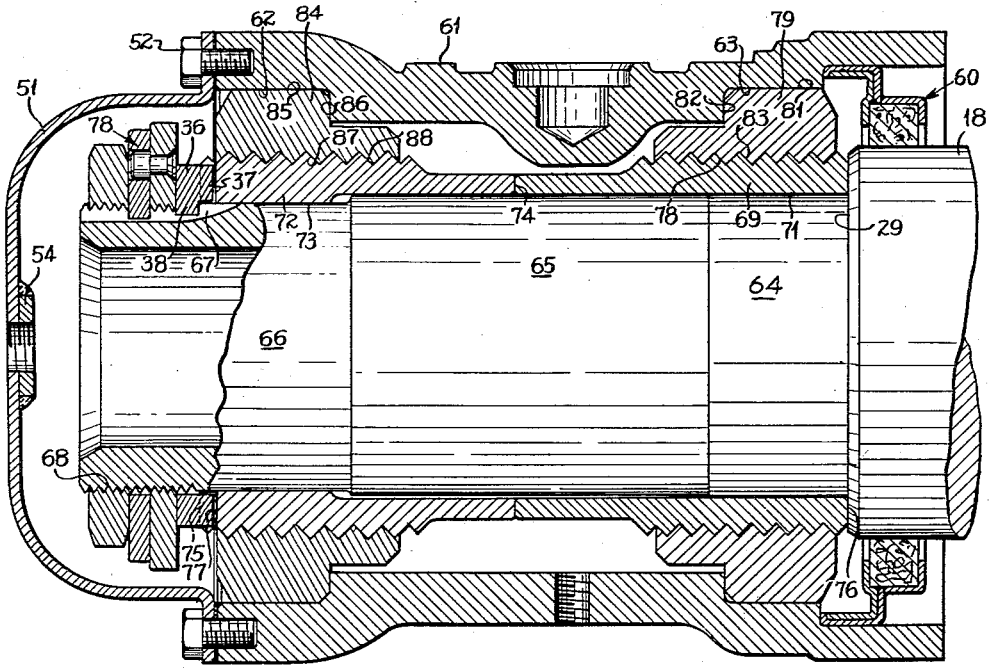

Figure 1 illustrates one side of a conventional tandem axle assembly wherein spaced drive axles 11 and 12 are connected to the vehicle frame by a series of upper and lower torque rods 13—16 which have their adjacent ends universally secured to suitable bracket structures 17 fixed to the vehicle frame. Brackets 17 at each side of the frame support a rigid cross tube 18, and the ends of cross tube 18 projecting beyond the brackets provide trunnions on which are mounted for oscillation spring seats 19 carrying the middle portion of leaf springs 21 having their opposite ends seated on the axle housings 11 and 12. Except for the bearing arrangements between the spring seats and trunnions, this structure is essentially conventional.

Figure 3 illustrates the end of the stationary cross member as it appears at each side of the vehicle and terminates in a reduced cylindrical portion 22 which serves as a trunnion about which the spring seat 19 oscillates during operation of the vehicle. Trunnion 22 may be hollow or solid and at its outer end it is formed with a key way 23, shown 90° out of position in Figure 3, and a short threaded section 24 the purpose of which will appear.

The spring seat illustrated at 19 is of a conventional structure which is used today with tapered roller bearings for mounting such spring seats upon the trunnions, and the trunnion 22 is the same as used previously. Spring seat 19 is preferably a solid block having a flat spring platform 20 above a hollow boss 30 surrounding the trunnion.

Adjacent its outer end the spring seat is formed with an internal cylindrical bore 25 and a flat radial wall 26 perpendicular to the axis of the bore. Near its inner end the spring seat is formed with another internal cylindrical coaxial bore 27 and a flat radial wall 28 also perpendicular to the axis of the bore. These cylindrical bores 25 and 27 were provided in the original spring seat structure for mounting the outer races of conventional conical thrust roller bearings.

The inner end of the reduced diameter trunnion 22 provides with the cross tube a flat radial shoulder 29 which is perpendicular to the axis of the trunnion and which in the conventional tapered roller bearing trunnion mounting prior to the invention served as an end abutment for an end of the inner bearing race at that point.

A sleeve bushing 31 which is preferably of steel has an internal cylindrical diameter at 32 which enables it to be mounted upon trunnion 22 with a light press fit and with its inner end face 33 abutting the shoulder 29 of the cross tube. This press fit is not relied upon to prevent rotation between the sleeve 31 and the trunnion 22. The outer periphery of sleeve 31 is formed with a continuous helical thread 34 from one end to the other. At its outer end sleeve 31 is formed with two straight-sided diametrically opposite slots 35 for a purpose to appear. Sleeve 31 is held against axial movement along trunnion 22 by abutment against surface 33 and by a flat faced locking ring 36 that engages face 39. Locking ring 36 has two axially projecting tangs 37 that fit into the slots 35 and a radial key 38, also shown 90° out of position in Figure 3, projecting into keyway 23 to prevent relative rotation between sleeve bushing 31 and trunnion 22.

As illustrated in Figure 3, the inner diameter of ring 36 is slightly greater than the threaded end portion 24 of the trunnion except for the tang 38. Ring 36 is backed by a nut 41 which is mounted on the threaded portion 24 with outer lock nut and washer assembly 42. When nut 41 is drawn up to the proper tightness to urge the sleeve 31 against shoulder 29 and to engage the tangs 37 in slots 35 it is held in position by the lock nut and washer assembly 42 the washer of which is keyed in keyway 23. This locks sleeve 31 against rotation on trunnion 22.

A second steel sleeve bushing 43 has its inner periphery threaded at 44 with the same pitch as threads 34 and is rotatably threaded thereby upon sleeve 31. In assembly of this structure the sleeve 43 is turned with respect to sleeve 31 until the two are substantially coextensive as illustrated. Then the sleeves are assembled into the spring seat 19 until the flat radial shoulder 45 of the enlarged outer end portion 46 of sleeve 43 abuts wall 26. Sleeve portion 46 has a cylindrical outer periphery 47 of such diameter as to have a tight press fit with the spring seat bore 25.

At the inner end of the spring seat, a uniform thickness annular cylindrical ring 48 is press fitted within bore 27 and also has a press fit with its internal cylindrical periphery 49 on the outer cylindrical periphery of sleeve 43, the inner flat end of ring 48 abutting wall 28 for locating it in the assembly. The spring seat 19 assembly with the sleeves 31 and 43 therein is then pressed over the trunnion 22 until inner sleeve end face 33 abuts shoulder 29.

Thus in the assembly, effectively spring seat 19 is rigid with sleeve 43 and ring 48, the parts being in tight press fit engagement. The inner sleeve 31 is non-rotatable with respect to the trunnion, so that during oscillation of the spring seat on the trunnion as the vehicle goes over rough ground sleeve 43 will rock over small angles back and forth with the load carried on the threaded areas 34 and 44. There will be a slight relative axial displacement of the sleeves 31 and 43 during this oscillation but since the angle of oscillation is very small and the pitch of the threads 34 and 44 is fairly fine, about eight threads per inch in a working embodiment, and since the outer sleeve 43 is free to become axially displaced slightly with respect to inner sleeve 31 by that small amount, this has no adverse effect upon operation of the vehicle. This axial displacement is well within the lateral tolerances of the spring assembly and this very small lateral shift of the spring seat is immaterial in operation of the vehicle.

At its outer end, the spring seat is provided with a cap 51 secured in oil tight relation to close the open outer end of the spring seat 19, as by studs 52 and a gasket 53. An aperture 54 normally closed by a plug is provided for introducing oil or other lubricant into the interior of the bushing assembly. The outer sleeve 43 is provided with one or more oil holes 55 whereby the lubricant may be conducted to the engaged threads 34 and 44 intermediate the ends of the sleeves.

At the inner end of the bearing seat, there is provided a conventional oil seal 56 between the bearing seat and the cross tube 18, and a rubber oil seal assembly 57 is fixed upon cross tube 18 with a resilient continuous annular lip 58 bearing in sealing engagement with the flat end face 59 of ring 48 whereby leakage of lubricant toward the seal 59 is retarded. This double seal has proved to be quite effective.

In operation, as one axle or the other rises or falls with respect to the other, spring seat 19 will oscillate about the axis of trunnion 22. In any event the oscillation will be a minor amount of a complete revolution. During oscillation of the spring seat in this invention the load will be uniformly distributed among and along the threaded portions 34 and 44 whereby the unit area load will be small and there is no tendency of the parts to freeze or gall.

In practice both sleeve bushings 31 and 43 are surface hardened steel, preferably being carburized to a surface hardness of reasonable depth to about 50 to 55 Rockwell C-scale. In a satisfactory form of the invention the threads 34 and 44 have a pitch of eight threads per inch and the thread side faces are at about 45°, but equivalent arrangements are within the scope of the invention. The ring 48 may also be hardened to provide a good press fit and a non-rotatable connection between the spring seat 19 and the outer sleeve 43.

Referring to the embodiment of the invention illustrated in Figure 6, spring seat 61 is formed adjacent its opposite open ends with cylindrical bores 62 and 63. At the inner end of the seat a grease seal assembly 60 seals the space between the relatively oscillating seat member 61 and the cross tube 18.

Cross tube 18 here terminates in a trunnion comprising successively outwardly reduced cylindrical sections 64, 65 and 66. Outer cylindrical section 66 is fomed with a keyway 67 and an external threaded portion 68.

At the inner end of this trunnion, a sleeve bushing 69 is mounted on the cylindrical section 64 of the trunnion as by a light press fit at surface 71. A similar sleeve bushing 72 is mounted on the outer cylindrical section 66 of the trunnion as by a press fit on surface 73. The adjacent ends of these sleeves solidly abut in an interface 74 which is preferably perpendicular to the axis of the trunnion. The end face 75 of sleeve 72 and the end face 76 of sleeve 69 are flat like the opposite ends of sleeve 31. At its outer end, sleeve 72 has two diametrically opposite flat sided slots 77 which are the same as those at 35 in sleeve 31, and the locking ring 36 has its tangs 37 engaged with slots 77 in the assembly and its radial tang 38 disposed in the keyway 67. A suitable lock nut and washer assembly 78, the washer of which is keyed in keyway 67, as illustrated in Figure 6, is provided on the threaded outer end of the trunnion and when this assembly is tightened ring 36 is advanced into locking engagement with the sleeve 72 which in turn forces the sleeves 72 and 69 into abutment and sleeve 69 against the flat shoulder 29 on the inner end of the cross member 18. The entire inner sleeve structure comprised of the individual sleeves 72 and 69 is locked tight with the trunnion by reason of the press fits and the locking action of the ring 36.

Sleeve 69 is threaded for a portion of its external periphery adjacent the inner end of the trunnion. An outer sleeve bushing 79 has its external cylindrical peripheral surface 81 press fitted within the bore 63 and it abuts the seat shoulder 82 at the inner end of the bore. Internally sleeve 79 is threaded at 83 for oscillation on threads 78 of the inner sleeve. Similarly a bushing sleeve 84 has its external periphery 85 press fitted within bore 62 and abuts seat shoulder 86. Sleeve 84 is internally threaded at 87 to oscillate on external threads 88 on inner sleeve 72.

In assembly of the apparatus shown in Figure 6, the outer sleeves 79 and 84 are press fitted into opposite ends of the bearing seat and then inner sleeves 69 and 72 are threaded into them. Then the entire assembly is forced endwise onto the trunnion and locked in place.

In both embodiments of the invention I therefore provide a threaded trunnion support for the spring seat wherein an inner sleeve assembly, which may be a single sleeve as in the preferred embodiment, or a plurality of sleeves in solid axial abutment as in the second embodiment, is substantially non-rotatably mounted on the trunnion and an outer corresponding sleeve assembly is non-rotatable with the spring seat. All initial adjustment is taken care of during assembly simply by rotating the threaded bearing sleeves. The bearing areas are the co-acting thread faces so that the load is widely distributed and the unit area pressures are so low that the metal is not galled. Moreover the engaged threads of the sleeves as the latter oscillate provide an oil circulating or pumping action which results in a cool long-wearing assembly. Either form of the invention can be substituted in the field for tapered roller bearing units.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a tandem axle vehicle suspension, a trunnion, a spring seat mounted to oscillate about the axis of said trunnion comprising a spring mounting platform and a portion surrounding said trunnion, an externally threaded inner bearing sleeve non-rotatably mounted on said trunnion and secured against axial displacement on said trunnion, an internally threaded outer bearing sleeve engaged with said inner sleeve over the major part of its length secured within said spring seat portion and fixed against rotation and axial displacement with respect to said spring seat, axially spaced bores in said spring seat portion each terminating in a radial wall facing the adjacent end of the spring seat, said outer sleeve having its outer end secured in the axially outermost of said bores, and a ring secured in the innermost of said bores surrounding and backing the inner end of said outer sleeve.

2. In the suspension defined in claim 1, means for introducing lubricant into the interior of said spring seat portion for lubricating said engaged threads, and a seal between said ring and the trunnion.

3. In a tandem axle suspension, a trunnion, a spring seat comprising a spring mounting platform and a portion surrounding said trunnion, and means mounting said spring seat for oscillation about the axis of said trunnion comprising an inner bearing sleeve assembly composed of two spaced externally threaded sleeves, means securing said sleeves against rotation and axial displacement with respect to said trunnion, and an outer bearing sleeve assembly comprising spaced internally threaded sleeves secured against rotation and axial displacement with respect to said spring seat and operatively engaged with the respective inner bearing sleeves.

4. In a tandem axle vehicle suspension, a trunnion, an externally threaded inner bearing sleeve surrounding said trunnion, a fixed stop at the inner end of said trunnion, a locking ring non-rotatably connected with said sleeve, means on the outer end of said trunnion for axially urging said ring against the outer end of said sleeve and urging the inner end of said sleeve against said stop, and a spring seat having internally threaded bearing engagement with said sleeve rockably mounted to oscillate about the axis of said trunnion, said ring and the outer end of said sleeve being formed with coacting tang and slot formations for non-rotatably connecting the ring and sleeve, and said ring having a radial projection engaged in a longitudinal slot on the trunnion for non-rotatably connecting the trunnion and ring.

5. In a vehicle suspension, a relatively fixed trunnion, externally threaded inner bearing sleeve means surrounding said trunnion, a fixed axial stop on said trunnion, a locking ring non-rotatably connected with said sleeve means by coacting projection and slot formations, means at the outer end of said trunnion for axially urging said ring against said sleeve means and said sleeve means against said stop, and a spring seat having internal threaded bearing engagement with said sleeve means rockably mounted to oscillate about the trunnion axis, said ring having a projection and slot connection with the trunnion for non-rotatably connecting said ring and the trunnion.

6. In a tandem axle vehicle suspension, a relatively fixed trunnion, a spring seat adapted to oscillate about the axis of said trunnion, a spring assembly intermediately mounted on said spring seat and adapted to be operatively connected to the tandem axles, an externally threaded inner bearing sleeve assembly on and surrounding said trunnion, locking means nonrotatably connected with said inner bearing sleeve assembly and said trunnion, means securing said locking means and said inner sleeve assembly against axial displacement on said trunnion, and an internally threaded outer bearing sleeve assembly fixed to said spring seat in surrounding relation to said inner bearing sleeve assembly, the threads of said sleeve assemblies being in load bearing contact to provide free rocking of said spring seat about the trunnion.

References Cited in the file of this patent

UNITED STATES PATENTS

| | | |
|---|---|---|
| 1,427,807 | Halbleib | Sept. 5, 1922 |
| 1,600,961 | Payne | Sept. 21, 1926 |
| 1,685,005 | Robertson | Sept. 18, 1928 |
| 1,908,799 | Tryon | May 16, 1933 |
| 1,948,110 | Hobler | Feb. 20, 1934 |
| 2,030,750 | Leighton | Feb. 11, 1936 |
| 2,096,530 | Alden | Oct. 19, 1937 |
| 2,481,891 | Van Raden | Sept. 13, 1949 |
| 2,517,208 | Hunt | Aug. 1, 1950 |
| 2,567,481 | Hickman | Sept. 11, 1951 |

FOREIGN PATENTS

| | | |
|---|---|---|
| 319,875 | Great Britain | Oct. 3, 1929 |